United States Patent [19]
Saito et al.

[11] Patent Number: 5,244,731
[45] Date of Patent: Sep. 14, 1993

[54] MARINE FISHERY THREAD ARTICLES

[75] Inventors: Yoshikiyo Saito, Moriyama; Yoshito Ikada, Uji; Masakazu Suzuki, Ayabe; Akio Kurishita, Ayabe; Hideji Kagawa, Ayabe; Isao Nogami, Ayabe, all of Japan

[73] Assignee: Gunze Limited, Kyoto, Japan

[21] Appl. No.: 715,250

[22] Filed: Jun. 14, 1991

[30] Foreign Application Priority Data

Jun. 15, 1990 [JP] Japan ................................. 2-158053
Nov. 26, 1990 [JP] Japan ................................. 2-323889

[51] Int. Cl.$^5$ ............................................. D02G 3/00
[52] U.S. Cl. .................................. 428/372; 428/359; 428/361; 524/413; 524/419; 43/7; 43/9.95; 43/44.98; 523/122; 424/404
[58] Field of Search .............. 524/401, 413, 419, 430; 428/361, 364, 359, 372; 523/122; 424/404; 528/354; 43/7, 9.95, 44.98

[56] References Cited

U.S. PATENT DOCUMENTS

| | | | |
|---|---|---|---|
| 1,897,274 | 2/1933 | Andrews | 43/9.95 |
| 2,886,580 | 5/1959 | Hintzmann | 424/404 |
| 2,890,208 | 6/1959 | Young et al. | 528/354 |
| 3,306,875 | 2/1967 | Hay | 528/212 |
| 3,423,482 | 1/1969 | Katsumura | 523/122 |
| 3,454,609 | 7/1969 | Considine | 523/122 |
| 4,045,418 | 8/1977 | Sinclair | 528/354 |
| 4,111,879 | 9/1978 | Mori et al. | 523/122 |
| 4,407,786 | 10/1983 | Drake et al. | 424/426 |

FOREIGN PATENT DOCUMENTS 3076813 4/1991 Japan ................................. 43/9.95

Primary Examiner—Patrick J. Ryan
Assistant Examiner—N. Edwards
Attorney, Agent, or Firm—Armstrong, Westerman, Hattori, McLeland & Naughton

[57] ABSTRACT

The invention provides a marine fishery article of threads which is made of threads consisting essentially of polycaprolactone represented by the formula

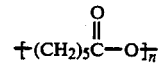

wherein n is 300 to 2,000.

18 Claims, No Drawings

MARINE FISHERY THREAD ARTICLES

The present invention relates to marine fishery articles of threads which are used in seawater, such as fishnets, fishing lines and so on.

Conventional marine fishery thread articles to be used in seawater such as fishnets and fishing lines are made of threads of synthetic fibers of polyamide, polyester, polyolefin or the like. These synthetic fibers, however, remain stable in seawater and retain the strength for a long period, so that the articles discarded in the sea cause the problem of environmental pollution. For example, when fishnets much used in inshore fishery are disposed of as industrial waste by incineration, the disposal results in the damage of incinerator and in air pollution. In pelagic fishery, worn-out fishnets may be dumped in the ocean, raising the problem of sea pollution. Likewise, fishing lines scrapped on the spot are arousing concern over adverse influence on wild birds and fishing grounds from the viewpoint of protection of natural environment.

In culture of sea breams, young yellowtails, prawns, scallops, edible cockles, ark shellfish and so on, fry or young shellfish are raised within nets or in a farm with nets fitted in its periphery. The foregoing culture not only poses the problem of sea pollution due to the nets thrown away in the sea, but suffers the following inconveniences. A long-term cultivation requires cumbersome labor to replace the nets every few months, and needs the removal of seaweeds, diatoms and the like attached to nets which otherwise would reduce the yield and the efficiency in handling the net.

It is the first object of the present invention to provide a novel marine fishery article of threads which is able, after a specific term, to rapidly decompose and degrade in seawater into extinction.

It is the second object of the invention to provide a novel marine fishery article of threads which is not only able after a specific term to rapidly decompose and degrade in seawater into extinction, but unlikely to permit diatoms and seaweeds to attach thereto during the service life.

These and other objects of the invention will become more apparent from the following description.

The marine fishery article of threads which can achieve the first object of the invention is characterized in that the article is made of threads consisting essentially of polycaprolactone represented by the formula (I)

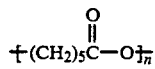

wherein n is 300 to 2,000.

The marine fishery article of threads which can achieve the second object of the invention is characterized in that the article is made of threads consisting essentially of the polycaprolactone represented by the formula (I), the threads having uniformly dispersed therein fine particles of water-soluble glass which contains a compound capable of dissociating copper ions or silver ions in water.

Our research revealed the following. The threads consisting essentially of the polycaprolactone of the formula (I) retain sufficient strength for about 3 to about 5 months in seawater but hydrolyze progressively from the thread surface after a lapse of about 3 to about 5 months. Thereupon microorganisms in seawater consume the hydrolyzed threads. Due to the repeated hydrolysis and consumption by microorganisms, the threads are rapidly degraded to result in reduced strength until substantial depletion of strength in about 5 to about 8 months and finally until extinction by microorganisms' complete consumption. The degrading behavior of the polycaprolactone threads depends markedly on microorganisms in seawater and entirely differs from the degrading behavior thereof in physiological saline. Stated more specifically, the polycaprolactone threads are degraded only gradually in physiological saline, and retains, for example, 90% or more of the strength even after a 6-month immersion therein at 37° C. Thus the degrading behavior of polycaprolactone threads in seawater is quite different and unexpected from the degrading behavior thereof in physiological saline. Because of this unique degrading behavior of polycaprolactone threads in seawater, the articles of said threads, when used in seawater as fishnets, fishing lines, ropes or the like, retain satisfactory strength during the specific term of about 3 to about 5 months but thereafter become rapidly degraded due to the hydrolysis and consumption by microorganisms. The decomposition product formed at this stage is non-toxic and does not adversely affect the ecosystem. After further standing, the degradation proceeds until complete depletion of strength, and ultimately the residue is consumed by microorganisms and extinguished. Thus the articles of threads of the invention even if discarded in seawater neither give rise to environmental pollution nor adversely affect the ecosystem. Utilizing the above characteristics, the articles of the invention can be suitably used as a protective net for culture of fish or shellfish to protect fry or young shellfish from invaders for months, or as a net for culture of fish or shellfish which requires the replacement of nets every few months. For example, the articles of the invention can be suitably used as a net for culture of scallops which needs the replacement of nets every few months as the young scallops grow. For replacement in this case, a new net can be applied directly over the old net without removal thereof, thereby lessening the amount of labor. As another example, the articles of the invention can be advantageously used as a protective net for culture of shellfish such as edible cockles, ark shellfish or the like in which the young shellfish should be protected from starfish or other invaders for months until the young shellfish grow to a size (5 to 7 cm) sufficient to survive invaders' attack.

Our research also found that when the polycaprolactone threads constituting the marine fishery article of the invention have uniformly dispersed therein fine particles of water-soluble glass containing a compound capable of dissociating copper or silver ions in water, the copper or silver ions are dissociated and released as the water-soluble glass dissolves out and the polycaprolactone decomposes in seawater. The release of ions substantially quantitatively continues for a specific term of use, so that diatoms and the like can be effectively prevented from clinging to the net. After the specific term of use, the polycaprolactone threads are hydrolyzed and degraded into extinction due to the consumption by microorganisms in seawater. As described above, the articles of the invention, utilizing said characteristics, can be suitably used as a protective net for culture of fish or shellfish to protect fry or young shellfish from invaders for months, or as a net for culture of fish and shellfish which needs the replacement of nets every few months. Also the articles of the invention assures the prevention of diatoms and the like from clinging thereto, so that the articles can obviate the disadvantages due to the adherence of diatoms and the like and can increase the yield. Furthermore, the articles of the invention left in seawater for disposal would neither cause sea pollution nor adversely affect the ecosystem.

The polycaprolactone for use in the present invention is a polymer represented by the foregoing formula (I).

The polymer can be prepared by polymerization of ε-caprolactone. Such polymer is commercially available, for example, under the trade name "PLACCEL H" (for polycaprolactones manufactured by Daicel Chemical Industries Ltd., Japan) and can be easily acquired at a relatively low cost. The polymer has a molecular weight of about 30,000 to about 200,000, preferably about 70,000 to about 100,00. Among the polycaprolactones available under the trade name series "PLACCEL H", "PLACCEL H4" is about 40,000 to about 60,000 in molecular weight, and "PLACCEL H7" is about 70,000 to about 100,000 in molecular weight. These two polymers are suitably used in the invention. More desirable of the two is PLACCEL H7 in which n in the formula (I) is $600 < n < 900$. The polycaprolactone has the advantages of being inexpensive, easily available, less susceptible to heat deterioration in spinning plants, properly flexible and easy to work into fishnets or other articles. The polycaprolactone can be used in the invention as admixed with a hydrolyzable polymer which is unlikely to impair the ability of the polycaprolactone to degrade in seawater. Examples of the polymer to be admixed with the polycaprolactone are homopolymers or copolymers produced by polymerization of one monomer or two or more monomers selected from glycolic acid, glycollide, L-lactide, D,L-lactide, D-lactide, paradioxanone, etc. In this case, the amount of the hydrolyzable polymer to be mixed is in the range which does not deteriorate the abilities of the polycaprolactone to hydrolyze and degrade in seawater. The amount is usually 15% by weight or less based on the polycaprolactone. The incorporation of the hydrolyzable polymer can vary the flexibility, strength and other properties.

According to the invention, the polycaprolactone is spun and stretched in the conventional manner into threads. When required, the polycaprolactone may be admixed, before spinning, with additives such as antibacterial agents, anti-fungus agents, calcium stearate or like lubricants, etc. The amount of these additives is about 15% by weight or less based on the polymer. In order to prevent diatoms and the like from attaching to nets and other articles of the invention, the polycaprolactone threads may be twisted with a silver or copper wire into a continuous strand or may be coated with a layer of a compound capable of dissociating copper or silver ions in water.

Our research shows that the adherence of diatoms and the like to nets can be most effectively prevented by the nets of the invention made of threads of polycaprolactone having uniformly dispersed therein fine particle of water-soluble glass containing the compound capable of dissociating copper or silver ions in water.

Examples of useful compounds which can dissociate copper ions in water are inorganic compounds such as $Cu_2O$, $Cu_2S$, $CuO$, $CuS$, copper halide, $Cu(OH)_2$, $CUSC_4$, etc., and organic compounds such as copper acetate, copper amino acetate, copper formate, etc. Examples of useful compounds which can dissociate silver ions in water are inorganic compounds such as $Ag_2O$, $Ag_2S$, $AgNO_3$, silver halide, $Ag_2SO_4$, $Ag_2CO_3$, etc., and organic compounds such as silver acetate, silver oxalate, silver salicylate, etc. Among these compounds, it is desirable in view of the compatibility with the glass to use $CuO$ and $Cu_2O$ as copper compounds and $Ag_2O$ as a silver compound. Copper compounds are more desirable than silver compounds from the viewpoint of prevention of diatoms and the like from adherence to the articles. These copper and silver compounds are usable singly or at least two of them can be used in mixture.

In the invention, the compound capable of dissociating copper or silver ions in water is essentially used as mixed with fine particles of water-soluble glass. Since the fine particles of water-soluble glass containing the compound capable of dissociating copper or silver ions in water are present in the polycaprolactone threads, the copper or silver ions are continuously, quantitatively released for the term of use in an amount sufficient to prevent diatoms and the like from attaching to nets, as the water-soluble glass dissolves out and the polycaprolactone decomposes in seawater, whereby the adherence of diatoms and the like to nets can be effectively prevented. Examples of such water-soluble glass include water-soluble glasses comprised of at least one network-forming oxide such as $SiO$, $B_2O_3$, $P_2O_5$, etc. and at least one network-modifying oxide such as $Na_2O$, $K_2O$, $CaO$, $MgO$, $BaO$, $Al_2O_3$, $ZnO$, $TiO_2$, etc. The solubility of the glass in water can be adjusted according to the ratio of the network-modifying oxide to the network-forming oxide, whereby the ability to prevent the adherence of diatoms and the period of sustaining the abilities can be controlled. Usually the ratio by weight of the former oxide to the latter oxide is between 3:7 and 7:3, preferably between 4:6 and 6:4. The water-soluble glass is used in the form of fine particles having a particle size of about 10 μm or less, preferably about 1 to about 5 μm.

The fine particles of water-soluble glass containing the copper or silver ion-dissociating compound can be produced as follows. In preparing the fine particles of water-soluble glass, at least one of said silver or copper ion-dissociating compounds is admixed with a material for glass, the mixture is vitrified and the obtained glass is finely divided. The amount of the copper or silver ion-dissociating compound to be used is widely variable and is typically in the range of about 0.1 to about 5% by weight, preferably about 0.5 to about 1% by weight, based on the water-soluble glass. To uniformly distribute the water-soluble glass particles containing the copper or silver ion-dissociating compound throughout the threads of polycaprolactone, the water-soluble glass particles are homgeneously mixed with pellets of polycaprolactone, and the mixture is spun. The amount of the water-soluble glass particles containing the copper or silver ion-dissociating compound is about 0.05 to about 2% by weight, preferably about 0.1 to about 0.5% by weight, based on the polycaprolactone.

The polycaprolactone containing or not containing the water-soluble glass particles can be spun under conventional spinning conditions, for example at a spinning temperature of about 120° to about 230° C. and a cooling temperature of about 1° to about 25° C. through a nozzle having fine holes of about 0.5 to about 1.5 mm in diameter at a draft speed of about 3 to about 10 m/min. The stretching is conducted at a temperature of about 50° to about 65° C. to achieve stretching to about 5 to about 10 times. The obtained threads have preferably strength of not less than about 5 g/d and elongation of about 20 to about 40%.

The articles of the invention which are composed of polycaprolactone having or not having uniformly dispersed therein the water-soluble glass particles containing the copper or silver ion-dissociating compound can be produced in any desired form such as a monofilament, multifilaments, twisted threads and braided threads. The threads obtained are worked into marine fishery articles to be used in seawater, such as a fishnet, fishing line, rope or the like.

The present invention will be described below in greater detail with reference to the following examples to which, however, the present invention is not limited.

EXAMPLE 1

A polycaprolactone (trade name "PLACCEL H7", product of Daicel Chemical Industries Ltd., Japan) having a weight average molecular weight of 85,000 was fused and extruded from a nozzle with fine holes of 1.0 mm in diameter at a temperature of 155° C. The extrudate was passed through water of 15° to 25° C. at a rate of 8 m/min and stretched to about 8 times, giving monofilaments of 0.25 mm in diameter for use as fishnets.

The properties of the monofilaments were determined according to the methods as defined in JIS L-1013, and the monofilaments were found to have strength of 5.98 g/d and elongation of 29.7%.

The monofilaments were immersed in seawater (20° C.) 1.5 m deep to check the relationship between the lapse of time and the strength. Table 1 shows the results, together with the results of monofilaments dipped in physiological saline (37° C.). The parenthesized figures in Table 1 represent the rate of residual strength (%) against the initial strength of 5.98 g/d.

TABLE 1

|  | Seawater (20° C.) Strength (g/d) | Physiological saline (37° C.) Strength (g/d) |
| --- | --- | --- |
| 1st month | 5.86 (98.0) | 5.90 (98.7) |
| 2nd month | 5.68 (95.0) | 5.86 (98.0) |
| 3rd month | 4.78 (79.9) | 5.77 (96.5) |
| 4th month | 3.23 (54.0) | 5.72 (95.7) |
| 5th month | 0.84 (14.4) | 5.69 (95.3) |
| 6th month | 0 | 5.68 (95.0) |

A polycaprolactone (trade name "PLACCEL H7", product of Daicel Chemical Industries Ltd., Japan) having a weight average molecular weight of 85,000 was admixed with 0.5% by weight of water-soluble glass particles (average particle size of 15 μm) and 0.1% by weight of calcium stearate, based on the weight of polycaprolactone. The water-soluble glass contains 1.0% by weight of CuO and consists of 65 mole % of $P_2O_5$, 15 mole % of CaO, 14 mole % of $Na_2O$ and 6 mole % of $Al_2O_3$. The mixture was homogeneously stirred and re-pelletized. The pellets were fused and extruded from a nozzle with fine holes of 1.0 mm in diameter at a temperature of 220° C. The extrudate was passed through water of 15° C. at a rate of 8 m/min and stretched to about 8 times, giving monofilaments of 0.25 mm in diameter and 558 deniers for use as nets in culture.

The properties of the monofilaments were determined according to the methods as defined in JIS L-1013, and the monofilaments were found to have strength of 6.38 g/d and elongation of 24.4%.

The monofilaments were immersed in seawater (20° C.) in a sample to seawater ratio of 1:1,000 to check the relationship between the lapse of time and the amount of Cu or Ag ions dissolved out. Table 2 shows the results.

TABLE 2

| Time | Amount of ions dissolved out (ng/cm$^2$) Monofilaments of Ex. 2 |
| --- | --- |
| 0 | 0 |
| 24 (hr) | 15 |
| 48 (hr) | 20 |
| 72 (hr) | 22 |
| 240 (hr) | 25 |
| 1 (month) | 28 |
| 2 (month) | 30 |
| 3 (month) | 33 |
| 4 (month) | 35 |
| 5 (month) | 38 |

A piece (square about 20 cm in each side) of the net made of the monofilaments obtained in Example 2 was attached to a stainless steel wire netting, and the assembly was immersed in seawater in a fish farm for 5 months (from June to November). The degree of adherence of diatoms and shells to the net and the variation of strength were compared with the results of a net (as a control) made of monofilaments obtained by the same method as in Example 2 except that the water-soluble glass was not used.

The net used as the control was made invisible in 6 weeks by fusakokemushi seaweed and shells thickly grown thereon. On the other hand, the net of the present invention was only thinly covered with pond scum-like organisms.

No variation in strength was observed in the two nets for 9 weeks. However, after a lapse of 12 weeks, the nets were rapidly damaged at the surface as if by worms, and the strength was diminished. The nets were extinguished after a lapse of 25 weeks.

The foregoing results were strinkingly contrasted with those obtained by in vitro experiments conducted in physiological saline at 37° C. in which no change was observed even after a lapse of 25 weeks.

We claim:

1. A net which comprises polycaprolactone represented by the formula

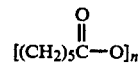

where n is 300 to 2,000 having uniformly dispersed therein fine particles of water soluble glass containing a copper or silver ion-dissociating compound in an amount of about 0.1 to about 5% by weight based on the water-soluble glass.

2. A net according to claim 1 wherein the polycaprolactone has a molecular weight of about 30,000 to about 200,000.

3. A net according to claim 2 wherein the polycaprolactone has a molecular weight of about 70,000 to about 100,000.

4. A net according to claim 1 wherein the compound capable of dissociating copper or silver ions in water is at least one member selected from the group consisting of Cu₂O, Cu₂S, CuO, CuS, copper halide, Cu(OH)₂, [CUSO₄] CuSO₄, copper acetate, copper amino acetate, copper formate, Ag₂O, Ag₂S, AgNO₃, silver halide, Ag₂SO₄, Ag₂CO₃, silver acetate, silver oxalate and silver salicylate.

5. A net according to claim 1 wherein the compound capable of dissociating copper or silver ions in water is at least one member selected from the group consisting of CuO, Cu₂O and Ag₂O.

6. A net according to claim 1 wherein the polycaprolactone contains about 0.05 to about 2% by weight of the water-soluble glass containing the copper or silver ion-dissociating compound based on the polycaprolactone.

7. A fishing line comprising polycaprolactone represented by the formula

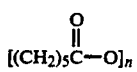

wherein n is 300 to 2,000 having uniformly dispersed therein fine particles of water soluble glass containing a copper or silver ion-dissociating compound in an amount of about 0.1 to about 5% by weight based on the water-soluble glass.

8. A fishing line according to claim 7 wherein the polycaprolactone has a molecular weight of about 30,000 to about 200,000.

9. A fishing line according to claim 8 wherein the polycaprolactone has a molecular weight of about 70,000 to about 100,000.

10. A fishing line according to claim 7 wherein the compound capable of dissociating copper or silver ions in water is at least one member selected from the group consisting of Cu₂O, Cu₂S, CuO, Cus, copper halide, Cu(OH)₂, CuSO₄, copper acetate, copper amino acetate, copper formate, Ag₂O, Ag₂S, AgNO₃, silver halide, Ag₂SO₄, Ag₂CO₃, silver acetate, silver oxalate and silver salicylate.

11. A fishing line according to claim 7 wherein the compound capable of dissociating copper or silver ions in water is at least one member selected from the group consisting of CuO, Cu₂O and Ag₂O.

12. A fishing line according to claim 1 wherein the monofilament of polycaprolactone contains about 0.05 to about 2% by weight of the water-soluble glass containing the copper or silver ion-dissociating compound based on the polycaprolactone.

13. A rope comprising polycaprolactone represented by the formula

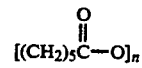

wherein n is 300 to 2,000 having uniformly dispersed therein fine particles of water soluble glass containing a copper or silver ion-dissociating compound in an amount of about 0.1 to about 5% by weight based on the water-soluble glass.

14. A rope according to claim 13 wherein the polycaprolactone has a molecular weight of about 30,000 to about 200,000.

15. A rope according to claim 14 wherein the polycaprolactone has a molecular weight of about 70,000 to about 100,000.

16. A rope according to claim 13 wherein the compound capable of dissociating copper or silver ions in water is at least one member selected from the group consisting of Cu₂O, Cu₂S, CuO, CuS, copper halide, Cu(OH)₂, CuSO₄, copper acetate, copper amino acetate, copper formate, Ag₂O, Ag₂S, AgNO₃, silver halide, Ag₂SO₄, Ag₂CO₃, silver acetate, silver oxalate and silver salicylate.

17. A rope according to claim 13 wherein the compound capable of dissociating copper or silver ions in water is at least one member selected from the group consisting of CuO, Cu₂O and Ag₂O.

18. A rope according to claim 13 wherein the polycaprolactone contains about 0.05 to about 2% by weight of the water-soluble glass containing the copper or silver ion-dissociating compound based on the polycaprolactone.

* * * * *